US011519363B2

(12) United States Patent
Hales et al.

(10) Patent No.: US 11,519,363 B2
(45) Date of Patent: Dec. 6, 2022

(54) HIGH PRESSURE RATIO GAS TURBINE ENGINE

(71) Applicant: ROLLS-ROYCE plc, London (GB)

(72) Inventors: Michael O Hales, Bristol (GB); Craig W Bemment, Derby (GB); Benjamin J Sellers, Bath (GB); Ian J Bousfield, Nottingham (GB); Amarveer S Mann, Derby (GB)

(73) Assignee: ROLLS-ROYCE plc, London (GB)

( * ) Notice: Subject to any disclaimer, the term of this patent is extended or adjusted under 35 U.S.C. 154(b) by 60 days.

(21) Appl. No.: 17/196,382

(22) Filed: Mar. 9, 2021

(65) Prior Publication Data
US 2021/0301718 A1 Sep. 30, 2021

(30) Foreign Application Priority Data

Mar. 26, 2020 (GB) ..................................... 2004382
Mar. 26, 2020 (GB) ..................................... 2004384
(Continued)

(51) Int. Cl.
F02K 3/06 (2006.01)
F02C 3/06 (2006.01)
(Continued)

(52) U.S. Cl.
CPC ............... F02K 3/06 (2013.01); F02C 3/06 (2013.01); F02C 7/36 (2013.01); F02C 3/107 (2013.01);
(Continued)

(58) Field of Classification Search
CPC ...... F02K 3/06; F02C 3/06; F02C 7/36; F02C 3/107; F02C 9/18; F05D 2220/3216;
(Continued)

(56) References Cited

U.S. PATENT DOCUMENTS 3,956,887 A   5/1976  MacDonald
4,976,102 A   12/1990 Taylor
(Continued)

FOREIGN PATENT DOCUMENTS

EP   3 372 808 A2   9/2018
EP   3 376 011 A1   9/2018
(Continued)

OTHER PUBLICATIONS

Engber et al., "Advanced Technologies for Next Generation Regional Jets—Survey of Research Activities at MTU Aero Engines," ISABE-2007-1282, Proceedings: XVIII International Symposium on Air Breathing Engines (ISABE), 18th ISABE Conference, Beijing, China, Sep. 2-7, 2007, pp. 1-11.
(Continued)

Primary Examiner — Jacob M Amick
(74) Attorney, Agent, or Firm — Oliff PLC

(57) ABSTRACT

A gas turbine engine (10) comprising:
a high pressure turbine (17);
a low pressure turbine (19);
a high pressure compressor (15) coupled to the high pressure turbine (17) by a high pressure shaft (27);
a propulsor (23) and a low pressure compressor (14) coupled to the low pressure turbine (19) via a low pressure shaft (26) and a reduction gearbox (30); wherein
the low pressure compressor (14) consists of four compressor stages (14) and defines a cruise pressure ratio of between 2.4:1 and 3.3:1;
the high pressure compressor (15) defines a cruise pressure ratio of less than 17:1; and
the high pressure compressor (15) and low pressure compressor (14) together define a cruise core overall pressure ratio of greater than 36:1.

15 Claims, 5 Drawing Sheets

(30) Foreign Application Priority Data

Mar. 26, 2020 (GB) .................................... 2004385
Mar. 26, 2020 (GB) .................................... 2004386
Mar. 26, 2020 (GB) .................................... 2004387

(51) Int. Cl.
*F02C 3/107* (2006.01)
*F02C 9/18* (2006.01)
*F02C 7/36* (2006.01)

(52) U.S. Cl.
CPC .......... *F02C 9/18* (2013.01); *F05D 2220/323* (2013.01); *F05D 2220/3216* (2013.01); *F05D 2240/60* (2013.01); *F05D 2260/40311* (2013.01)

(58) Field of Classification Search
CPC ........... F05D 2220/323; F05D 2240/60; F05D 2260/40311
See application file for complete search history.

(56) References Cited

U.S. PATENT DOCUMENTS

| | | | |
|---|---|---|---|
| 5,042,245 | A | 8/1991 | Zickwolf, Jr. |
| 6,312,221 | B1 | 11/2001 | Yetka et al. |
| 11,047,303 | B2 | 6/2021 | Mardjono et al. |
| 2003/0056580 | A1 | 3/2003 | Sawada et al. |
| 2012/0198816 | A1 | 8/2012 | Suciu et al. |
| 2013/0202415 | A1 | 8/2013 | Karl et al. |
| 2013/0223986 | A1 | 8/2013 | Kupratis et al. |
| 2016/0319829 | A1 | 11/2016 | McCune et al. |
| 2018/0058246 | A1 | 3/2018 | Keenan |
| 2018/0230912 | A1 | 8/2018 | Hasel et al. |
| 2019/0048826 | A1 | 2/2019 | Pointon et al. |
| 2020/0040845 | A1* | 2/2020 | Swift ................. F02K 3/06 |

FOREIGN PATENT DOCUMENTS

| | | |
|---|---|---|
| EP | 3 444 468 A1 | 2/2019 |
| EP | 3 546 737 A1 | 10/2019 |
| EP | 3 604 783 A1 | 2/2020 |
| EP | 3 670 886 A1 | 6/2020 |
| GB | 706563 A | 3/1954 |

OTHER PUBLICATIONS

Sep. 21, 2021 Office Action issued in U.S. Appl. No. 17/196,393.
Sep. 21, 2020 Combined Search and Examination Report issued on Great Britain Application No. 2004384.0.
Sep. 18, 2020 Search Report issued in Great Britain Application No. 2004387.3.
Sep. 18, 2020 Search Report issued in Great Britain Application No. 2004382.4.
Sep. 21, 2020 Combined Search and Examination Report issued in Great Britain Application No. 2004386.5.
Sep. 21, 2020 Combined Search and Examination Report issued in Great Britain Application No. 2004385.7.
U.S. Appl. No. 17/196,345, filed Mar. 9, 2021 in the name of Bousfield et al.
U.S. Appl. No. 17/196,393, filed Mar. 9, 2021 in the name of Bousfield et al.
U.S. Appl. No. 17/196,460, filed Mar. 9, 2021 in the name of Stieger.
U.S. Appl. No. 17/196,546, filed Mar. 9, 2021 in the name of Bousfield et al.
L. Hilgenfeld et al.; "Experimental Investigation of Turbulence Structures in a Highly Loaded Transonic Compressor Cascade with Shock/ Laminar Boundary Layer Interactions"; Engineering Turbulence Modeling and Experiments; Science Direct; 2022; vol. 5; pp. 1-15.
Mar. 9, 2022 Office Action issued in U.S. Appl. No. 17/196,546.
Jul. 16, 2021 Extended Search Report issued in European Application No. 21161761.8.
Jul. 13, 2021 Extended Search Report issued in European Application No. 21161766.7.
Bijewitz, J. et al. "Architectural Comparison of Advanced Ultra-High Bypass Ratio Turbofans for Medium to Long Range Application". Deutscher Luft- und Raumfahrtkongress, pp. 1-12, 2014.
Knip, Jr., Gerald. "Analysis of an Advanced Technology Subsonic Turbofan Incorporating Revolutionary Materials". NASA Technical Memorandum 89868, 25 pages, 1987.
Jul. 28, 2021 Extended Search Report issued in European Application No. 21161757.6.
Jul. 28, 2021 Extended Search Report issued in European Application No. 21161763.4.
Jul. 8, 2021 Extended Search Report issued in European Application No. 21161765.9.
Apr. 19, 2022 Office Action issued in U.S. Appl. No. 17/196,460.
Jane's Aero-Engines, Issue Seven, Edited By Bill Gunston, Jane's Information Group Inc., Alexandria, Virginia, 2000, pp. 1-6 and 510-512, (Year: 2000).
Jan. 3, 2022 Office Action issued in U.S. Appl. No. 17/196,393.
Guynn, Mark, et al. "Analysis of Turbofan Design Options For An Advanced Single-Aisle Transport Aircraft." l9th AIAA Aviation Technology, Integration, and Operations Conference (ATIO) an Aircraft Noise and Emissions Reduction Symposium (ANERS), 2009. (Year: 2009).
Lufthansa Technical Training, A319/A320/A321, Jul. 1999. (Year: 1999).
Walsh and Fletcher, "Gas Turbine Performance," 2nd edition, Copyright 1998, 2004 by Blackwell Science Ltd a Blackwell Publishing company. (Year: 2004).
Naylor, et al. "Optimization of Nonaxisymmetric Endwalls in Compressor S-Shaped Ducts," Journal of Turbomachinery, Jan. 2010, vol. 132, pp. 1-10. (Year: 2010).
Waters et ai, "Analysis of Turbofan Propulsion System Weightand Dimensions," NASA TM X-73, 199,1977. (Year: 1977).
Jan. 26, 2022 Office Action issued in U.S. Appl. No. 17/196,460.
Jan. 14, 2022 Office Action issued in U.S. Appl. No. 17/196,345.
Aug. 9, 2022 Office Action issued in U.S. Appl. No. 17/196,460.
May 26, 2022 Office Action issued in U.S. Appl. No. 17/196,345.
D. W. Bailey; "The Aerodynamic Performance of an Annular S-Shaped Duct"; PhD thesis, Department of Aeronautical and Automotive Engineering and Transport Studies, Loughborough University, Aug. 1997; pp. i-349.
K. M. Britchford; "The Aerodynamic Behaviour of an Annular S-shaped Duct"; PhD thesis, Loughborough University Jun. 1998; pp. ii-438.
K.M. Britchford et al.; "Measurement and Prediction of Flow in Annular S-shaped Ducts"; Engineering Turbulence Modelling and Experiments 2; © 1993 Elsevier Science Publishers B.V.; pp. 785-794.
A.D. Walker et al.; "An Aggressive S-Shaped Compressor Transition Duct With Swirling Flow and Aerodynamic Lifting Struts"; Proceedings of ASME Turbo Expo 2014: Turbine Technical Conference and Exposition, GT2014-25844, Jun. 16-20, 2014, Düsseldorf, Germany; Copyright ©2014 by Rolls-Royce plc; pp. 1-12.
A. Duncan Walker et al.; "The Influence of Fan Root Flow on the Aerodynamic of a Low-Pressure Compressor Transition Duct"; Journal of Turbomachinery; Copyright 2019 by Rolls-Royce plc; Jan. 2020; vol. 142; pp. 011002-1-011002-11.
Jul. 8, 2022 Notice of Allowance issued in U.S. Appl. No. 17/196,546.
Jun. 10, 2022 Advisory Action issued in U.S. Appl. No. 17/196,460.

* cited by examiner

HIGH PRESSURE RATIO GAS TURBINE ENGINE

The present disclosure relates to gas turbine engine for an aircraft

Existing gas turbine engines are known, in which a reduction gearbox is provided between a turbine and a propulsive fan. Such engines are known as "geared turbofans".

It desirable to increase the fuel efficiency of such engines. There are essentially two methods to increase fuel efficiency—increased propulsive efficiency, and increased thermal efficiency. It is an objective of the present invention to provide a gas turbine engine architecture that provides improved fuel efficiency According to a first aspect there is provided a gas turbine engine comprising:
a high pressure turbine;
a low pressure turbine;
a high pressure compressor coupled to the high pressure turbine by a high pressure shaft;
a propulsor and a low pressure compressor coupled to the low pressure turbine via a low pressure shaft and a reduction gearbox; wherein
the low pressure compressor consists of four or five compressor stages and defines a cruise pressure ratio of between 2.4:1 and 3.3:1;
the high pressure compressor defines a cruise pressure ratio of less than 18:1; and
the high pressure compressor and low pressure compressor together define a cruise core overall pressure ratio of greater than 36:1.

The inventors have found that the above defined characteristics can provide a gas turbine engine having a high overall pressure ratio (and so high thermal efficiency), with relatively few stages, and with a relatively low pressure ratio high pressure compressor. Such a relatively low pressure ratio high pressure compressor can provide for numerous advantages, such as a reduction in variable stator stages and bleed valves, which can in turn result in reduced weight and cost.

The cruise core overall pressure ratio may be between 36:1 and 56:1. The cruise overall pressure ratio may be any of 36:1, 38:1, or 40:1.

The low pressure compressor may define an average stage cruise pressure ratio of between 1.24:1 and 1.34:1.

The high pressure compressor may consist of between 7 and 11 stages.

The high pressure compressor may define a cruise pressure ratio of between 12:1 and 18:1.

The high pressure turbine may consist of two or fewer stages.

The low pressure turbine may comprise four or fewer stages and may comprise three stages.

The low pressure compressor may be positioned axially upstream of the high pressure compressor. The high pressure compressor may be arranged to receive (for example directly receive, for example via a generally annular duct) flow from the low pressure compressor.

The gearbox may be arranged to be driven by the shaft that is configured to rotate (for example in use) at the lowest rotational speed (for example the low pressure shaft in the example above).

The engine may comprise a core casing and a nacelle, wherein at least one of the core casing the nacelle comprise carbon composite material.

Any type of reduction gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the propulsor and compressors. For example, the combustor may be directly downstream of (for example at the exit of) the high pressure compressor. By way of further example, the flow at the exit to the combustor may be provided to the inlet of the high pressure turbine.

The propulsor may be in the form of an open rotor, or a ducted fan.

Each compressor and/or turbine stage may comprise a row of rotor blades and a row of stator vanes, which may be variable stator vanes (in that their angle of incidence may be variable). The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall core pressure ratio of a gas turbine engine as described and/or claimed herein may be defined as the ratio of the stagnation pressure downstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 36, 40, 45, 50, 55. The overall core pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The method may comprise, at cruise conditions, operating the low pressure compressor (14) to provide a pressure ratio of between 2.4:1 and 3.3:1, operating the high pressure compressor (15) to provide a pressure ratio of less than 18:1, and operating the low and high pressure compressors (14, 15) to provide a pressure ratio of greater than 36:1.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which:

FIG. 4 is a sectional front view of a reduction gearbox of the gas turbine engine of FIG. 1; and.

Figure 1:
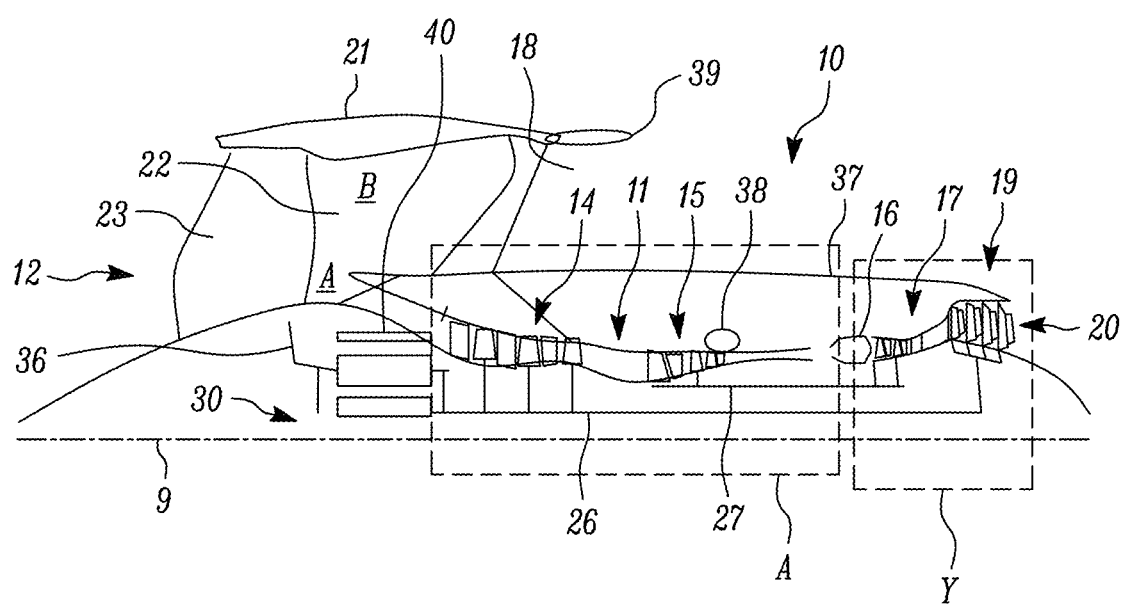
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

The engine core 11 is surrounded by a core casing 37, which contains the compressor 14, 15, combustor 16 and turbines 17, 19. The core casing 37 comprises one or more handling bleeds comprising one or more valves 38 configured to communicate between the core compressor flow path A (e.g. at the downstream end of the high pressure compressor 15) and the fan flowpath B. The core casing 37 comprises a carbon composite material such as carbon fibre reinforce plastic (CFRP).

Similarly, the engine nacelle 21 comprises a carbon composite material, such as CFRP. For example, a Thrust Reverser Unit (TRU) 39 provided at a rear of the nacelle 21 may comprise carbon composite material.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 4:
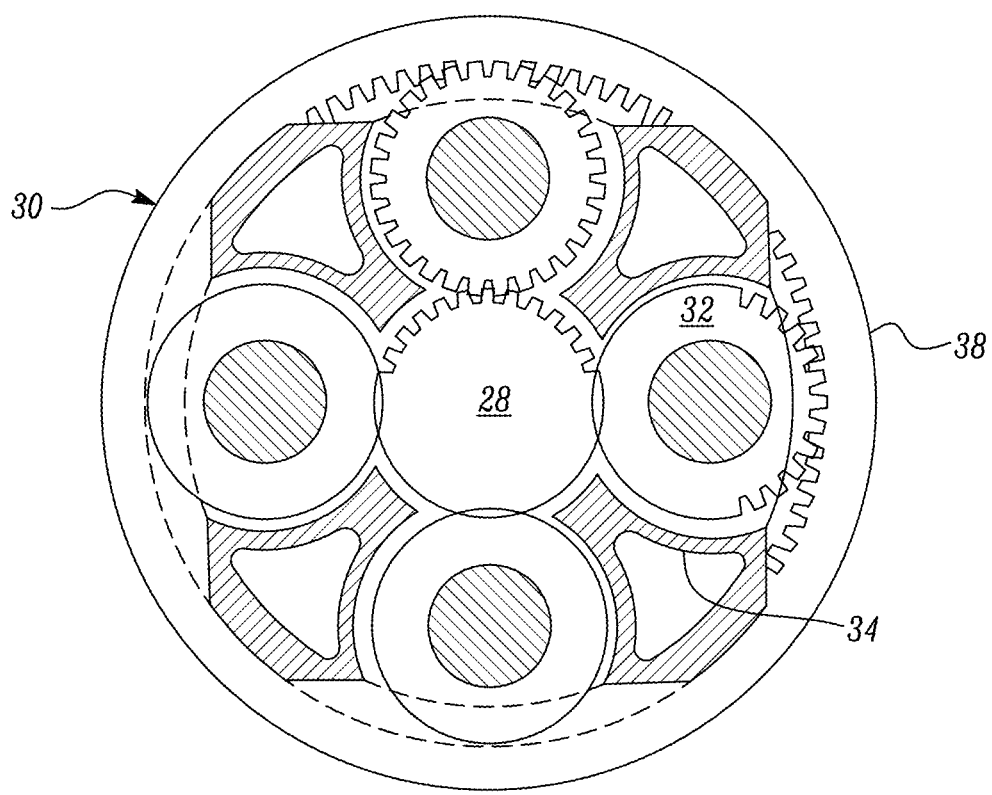

An exemplary arrangement for a geared fan gas turbine engine 10 is shown in FIG. 4. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

The epicyclic gearbox 30 is shown by way of example in greater detail in FIG. 4. Each of the sun gear 28, planet gears 32 and ring gear 38 comprise teeth about their periphery to intermesh with the other gears. However, for clarity only exemplary portions of the teeth are illustrated in FIG. 4. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIG. 4 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIG. 4 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 1 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Other gas turbine engines to which the present disclosure may be applied may have alternative configurations. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
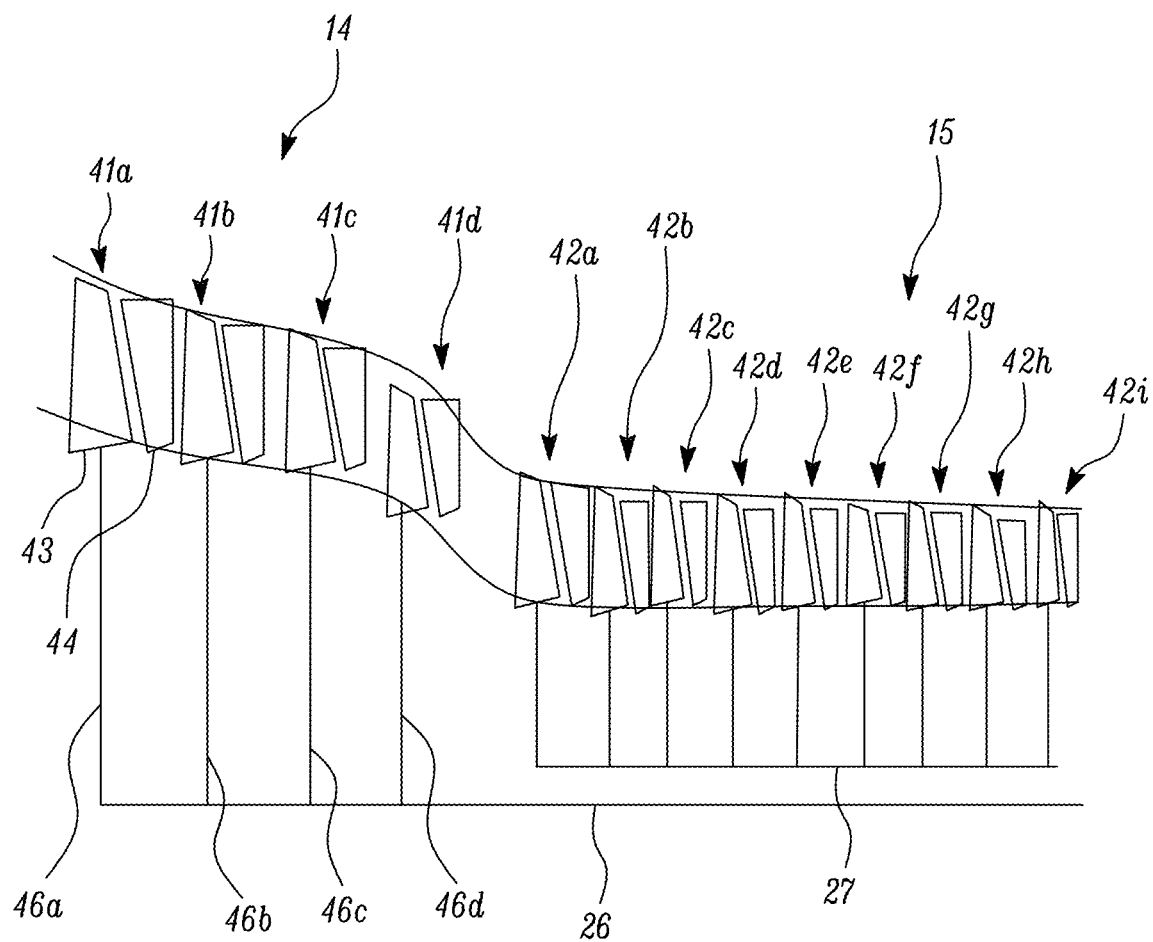
FIG. 2 is a close up sectional side view of an upstream portion of the gas turbine engine of FIG. 1.

Referring now to FIG. 2, the low pressure and high pressure compressor 14, 15 are shown in more detail. As can be seen, each of the compressors comprises a multi-stage, axial flow compressor.

The low pressure compressor consists of four or five stages (i.e. no more than five stages, and no fewer than four stages) 41a-d. Each stage 41a-d comprises at least one respective compressor rotor 43, and may comprise a respective stator 44. The respective rotor 43 and stator 44 are generally axially spaced. In the present case, the first stator 44 is downstream in core flow of the first rotor 43. One or more further stators such as an inlet stator (not shown) may be provided—however, since no additional rotor is associated with the inlet stator, this does not constitute an additional stage, since no pressure rise is provided by the inlet stator alone. As will be appreciated by the person skilled in the art, the rotors 43 are coupled to the respective shaft (i.e. the low pressure shaft 26 in the case of the low pressure compressor 14) by corresponding discs 46a-d, and so turn with the shaft 26. On the other hand, the stators 44 are held stationary. In some cases, the stators 44 may pivot about their long axes, to adjust the angle of attack and inlet and outlet area for the respective compressor stage. Such stators are known as "variable stator vanes" or VSVs.

The high pressure compressor 15 similarly comprises between seven and ten stages inclusive, and in the described embodiment consists of nine stages. Again, each stage comprises at least a rotor, and may also comprise a stator.

Figure 3:
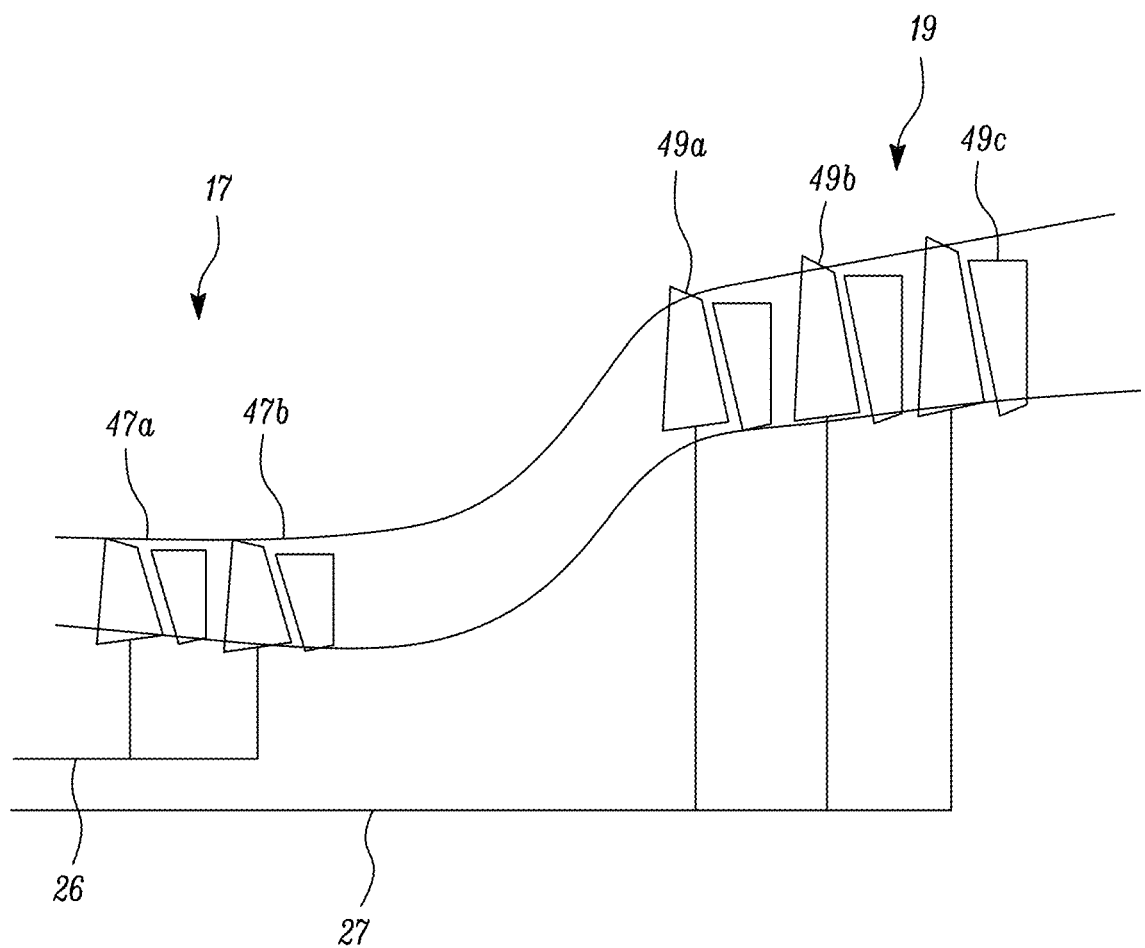
FIG. 3 is a close up sectional side view of a turbine section of the gas turbine engine of FIG. 1.

The turbine is shown in FIG. 3. To drive the high pressure compressor 15, a high pressure turbine 17 having two stages 47a, 47b may be necessary. Again, the number of turbine stages can be determined in a similar manner to the number of compressor stages. Alternatively, a single turbine stage may be provided. In particular, it has been found that high pressure compressors having cruise pressure ratios up to 13:1 can be driven by single stage turbines. Similarly, to drive the low pressure compressor 14 and fan 23, three or four low pressure turbine stages 49a-c are provided. In some cases, five compressor stages may be provided.

Between them, the high and low pressure compressors 15, 16 define a maximum in use overall core pressure ratio (OPR). The core OPR is defined as the ratio of the stagnation pressure upstream of the first stage 44 of the low pressure compressor 15 to the stagnation pressure at the exit of the highest pressure compressor 16 (before entry into the combustor). The core OPR excludes any pressure rise generated by the fan 23 where the fan provides air flow to the core, so a total engine overall pressure ratio (EPR) may be higher than the core OPR. In the present disclosure, the overall core OPR is between 36:1 and 56:1. In the described embodiment, the core OPR is 40, and may take any value between these upper and lower bounds. For example, the core OPR may be any of 36, 40, 45, 50, 55 and 56.

As will be understood, the core OPR will vary according to atmospheric, flight and engine conditions. However, the cruise OPR is as defined above.

As will be understood, a large design space must be considered when designing a gas turbine engine to determine an optimal engine with respect to a chosen metric (such as engine weight, cost, thermal efficiency, propulsive efficiency, or a balance of these). In many cases, there may be a large number of feasible solutions for a given set of conditions to achieve a desired metric.

One such variable is core OPR. As core OPR increases, thermal efficiency also tends to increase, and so a high OPR is desirable. Even once a particular OPR is chosen however, a number of design variables must be chosen to meet the chosen OPR.

One such design variable is the amount of pressure rise provided by the low pressure compressor 15 relative to that provided by the high pressure compressor 16 (sometimes referred to as "worksplit"). As will be understood, the total core OPR can be determined by multiplying the low pressure compressor pressure ratio (i.e. the ratio between the stagnation pressure at the outlet of the low pressure compressor to the stagnation pressure at the inlet of the low pressure compressor 15) by the high pressure compressor ratio (i.e. the ratio between the stagnation pressure at the outlet of the high pressure compressor 16 to the stagnation pressure at the inlet of the high pressure compressor 16). Consequently, a higher core OPR can be provided by increasing the high pressure compressor ratio, the low pressure compressor ratio, or both.

The inventors have found that a particularly efficient work split for a gas turbine engine having a core OPR in the above described range can be provided by providing a low pressure compressor 14 consisting of four or five stages, and having a pressure ratio of between 2.4:1 and 3.3:1. A high pressure compressor is then provided having a pressure ratio below 18:1, such that the overall core pressure ratio is above 36:1. It has been found to be feasible to provide a pressure ratio of 18:1 on a high pressure compressor provided on a single shaft using current technology using a reasonable number of compressor stages, without requiring an excessive number of variable stages, and at a reasonable rotational speed to give high overall efficiency. Consequently, to provide the necessary core OPR, a low pressure compressor ratio of between 2.4:1 and 3.3:1 is required.

Similarly, there are a number of ways to increase the compressor pressure ratio. A first method is to increase the stage loading. Stage loading is defined as the stagnation pressure ratio across an individual stage (rotor and stator) of a compressor. Similarly, an average stage loading can be defined as the sum of the stage loadings of each compressor stage of a compressor, divided by the number of stages. For example, in the present disclosure, the average stage loading of the low pressure compressor 14 is between 1.24 and 1.34. This can in turn be managed by one or more of increasing the rotor speed at the maximum compression conditions, increasing the turning provided by the blades, or increasing the radius of the tips of the compressor rotors, which in turn necessitates an increase in the radius of the roots of the compressor rotors to maintain a given flow area. Each of these options has associated advantages and disadvantages. For instance, increasing low pressure compressor rotor speed necessitates either an increase in the reduction ratio of the gearbox 30, or a reduction in the fan 23 radius, in order to maintain fan tip speeds at a desired level for noise and efficiency reasons. On the other hand, increasing the compressor tip radius necessitates an increase in weight, in view of the larger compressor discs that are required. Increased turning of the airflow may result in lower surge margin, and reduced efficiency. In any case, a higher stage loading may result in a lower efficiency, since the increased rotor tip speed or higher turning leads to lower compressor efficiencies, in view of losses associated with aerodynamic shocks as the tips significantly exceed the speed of sound.

A second option is to increase the number of stages in the respective compressors, thereby maintaining a low stage loading, low rotational speed, and low disc weight. Again, this can be achieved by adding a stage to either the low pressure compressor 15 or high pressure compressor 16. However, this will generally result in a higher weight and cost associated with the additional stage.

A further complication is the presence of the gearbox 30. The gearbox provides additional design freedom, since, as noted above, the gearbox reduction ratio can be selected to provide a preferred fan tip speed independently of both fan radius and low pressure compressor rotor speed. However, the gearbox also presents constraints in view of its large size. Consequently, the large radius required radially inward of the fan 23 inherent in a geared turbofan having an epicyclic gearbox dictates a fan 23 having a large hub radius, i.e. a large radial distance between the engine centre 9 and the aerodynamic root of the fan blades 23. Furthermore, in view of the relatively slow turning fan typical of geared turbofans, relatively little pressure rise is provided by the inner radius of the fan 23, and so geared turbofans tend to have a high hub to tip ratio fan 23.

The inventors have explored this design space, and found an optimum range of stage numbers and compressor pressure ratios, that provides an optimal mix of weight and efficiency.

Figure 5:
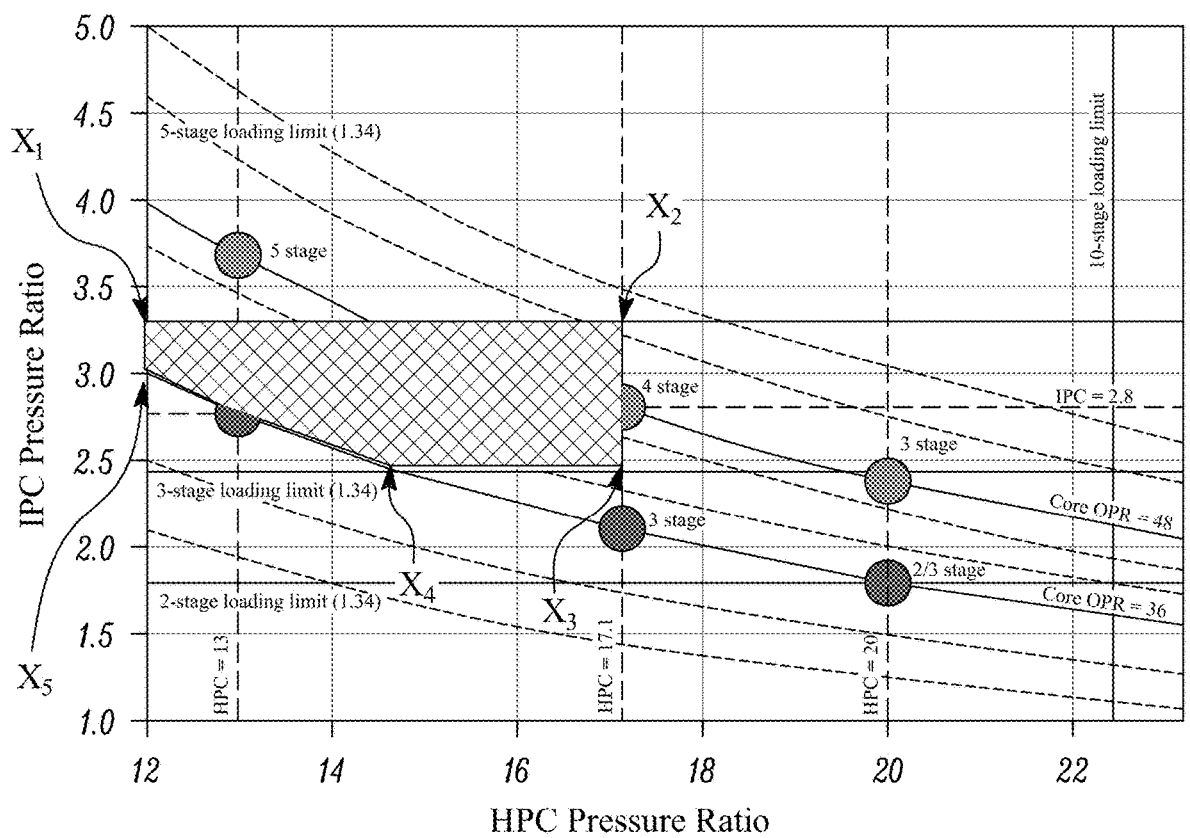
FIG. 5 is a graph illustrating a design space for the compressor section of FIG. 2.

Referring to FIG. 5, the above optimum parameters define a design space for the compressor (shown as the hatched region on the graph).

In general, a relatively large amount of work (compression) is carried out by the low pressure compressor relative to the high pressure compressor in the present disclosure, while providing a relatively high overall core pressure ratio of at least 36:1.

The inventors have found that compressor efficiency (particularly in the high pressure compressor) is improved by having providing relatively low work per stage. The inventors have also found that weight and length concerns dominate when more than eleven high pressure compressors are provided. Similarly, increasing the high pressure compressor rotational speed to provide a higher compressor pressure ratio results in higher disc weights, in view of the higher centrifugal loads. Finally, high pressure compressor pressure ratios result in high bearing end loads, again resulting in higher weight. This results in a limit of around 18:1 for the high pressure compressor cruise pressure ratio. By providing a low pressure compressor having a relatively high pressure ratio, with relatively few (four or five) stages, a high overall core pressure ratio can be achieved, without the disadvantages associated with high pressure ratio high pressure compressors.

Further advantages are provided by the disclosed arrangement. As noted above, carbon at least one of the core casing 37 in the region of the handling bleeds, and the nacelle 21 in the region of the TRU 39, may be formed of carbon composite material. Such material is relatively lightweight and strong, and so provides numerous advantages. However, conventionally in high overall core pressure ratio engines, the use of such material would be precluded, in view of the large volume of hot, high pressure air that would be emitted from the handling bleeds at low power. such hot, high pressure gasses impinging on the core casing 37 and nacelle 21 would exceed the temperature capabilities of this material. By adjusting the worksplit as taught in the present disclosure, large handling bleed volumes at low power are avoided, and so carbon composite materials can be utilised in these areas. Consequently, a lightweight engine can be provided.

One corner of the design space $X_1$ is defined by the maximum low pressure compressor 14 cruise pressure ratio (3.3:1), and the minimum high pressure compressor 15 cruise pressure ratio (12:1) to achieve the minimum require overall core pressure ratio (36:1). Above this low pressure cruise pressure ratio (3.3:1), it has been found that compressor stability cannot be assured, without increasing either rotational speed or diameter (and so compressor blade tip speed in either case). However, where compressor tip speed is increased, efficiency begins to fall, and so the advantages of higher loading are lost. The inventors have found that a low pressure cruise pressure ratio of 3.1:1 can be provided with no more than five stages. Indeed, the inventors have found that this cruise pressure ratio can be provided with only four low pressure compressor stages. Similarly, overall engine efficiency suffers when the overall core engine pressure ratio falls below 36:1, particularly in view of the relatively small pressure rise generated by the fan in a geared turbofan.

A second corner of the design space $X_2$ is defined by the maximum low pressure compressor 14 cruise pressure ratio (3.3:1), and the maximum high pressure compressor 15 cruise pressure ratio (18:1) that can reasonably be sustained, without requiring excessive stage numbers, and increased weight. This combination gives an overall core pressure ratio of 56:1. Above this value, increases in thermal efficiency begin to be outweighed by increases in weight, and so the design goals of increased overall propulsion system efficiency are not achieved. In particular, the inventors have found that the above parameters can be provided using a high pressure compressor having eleven or fewer stages, with relatively low work per stage. This relatively low work per stage provides for high compressor efficiency, while the high overall pressure ratio results in high overall engine efficiency.

A third corner of the design space $X_3$ is defined by the maximum high pressure compressor 15 cruise pressure ratio (18:1) that can reasonably be sustained, and the minimum low pressure compressor cruise pressure ratio (2.4:1) that requires four compressor stages. Below this value, only three low pressure compressor stages are required. This combination gives an overall core pressure ratio of 40:1, which provides good thermal efficiency, with a small number of overall compressor stages.

A fourth corner of the design space $X_4$ is defined by the minimum high pressure compressor cruise pressure ratio required to achieve the required overall core pressure ratio of 36:1 at the minimum low pressure compressor 14 stage loading for which four compressor stages are required (2.4:1). This gives a high pressure compressor cruise pressure ratio of approximately 15:1.

A fifth corner of the design space $X_5$ is defined. At this point, a higher low pressure compressor cruise pressure ratio of 3.0:1 is provided, and a lower high pressure compressor cruise pressure ratio of 12:1 is provided, while providing the minimum overall core compressor pressure ratio of 36:1.

The designer is hence taught how to design a compressor which achieves the desired characteristics of high overall core cruise pressure ratio (greater than 36:1), while minimising stage count and maximising compressor efficiency.

Two example gas turbine engines that have been considered by the inventors are described below.

A first example engine has a maximum take-off thrust at sea level under ISO conditions of approximately 45,000 pounds-force (lbf). The low pressure compressor has four stages, and is configured to provide a cruise pressure ratio of approximately 2.8:1. The high pressure compressor is configured to provide a cruise pressure ratio of approximately 13:1. This gives an overall core pressure ratio of approximately 36:1. Such an engine is thought to provide an optimum mix of weight and thermal efficiency for an engine in this class, since weight is a more important factor in this class than for higher thrust engines, in view of the shorter typical mission ranges of aircraft for which engines of this thrust are designed.

A second example engine has a maximum take-off thrust at sea level under ISO conditions of approximately 84,000 pounds-force (lbf). The low pressure compressor has four stages, and is configured to provide a cruise pressure ratio of approximately 2.8:1. The high pressure compressor is configured to provide a cruise pressure ratio of approximately 17:1. This gives an overall core pressure ratio of approximately 48:1. Such an engine is thought to provide an optimum mix of weight and thermal efficiency for an engine in this class, since thermal efficiency is a more important factor in this class than for lower thrust engines, in view of the longer typical mission ranges of aircraft for which engines of this thrust are designed.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising:
   a high pressure turbine;
   a low pressure turbine;
   a high pressure compressor coupled to the high pressure turbine by a high pressure shaft;
   a propulsor and a low pressure compressor coupled to the low pressure turbine via a low pressure shaft and a reduction gearbox, wherein:
   the low pressure compressor consists of four or five compressor stages and defines a cruise pressure ratio of between 2.4:1 and 3.3:1;
   the high pressure compressor defines a cruise pressure ratio of less than 18:1; and
   the high pressure compressor and the low pressure compressor together define a cruise core overall pressure ratio of greater than 36:1.

2. The turbine engine according to claim 1, wherein the cruise core overall pressure ratio is between 36:1 and 56:1.

3. The turbine engine according to claim 2, wherein the cruise core overall pressure ratio is 36:1, 38:1, or 40:1.

4. The turbine engine according to claim 1, wherein the low pressure compressor defines an average cruise stage pressure ratio of between 1.24:1 and 1.34:1.

5. The gas turbine engine according to claim 1, wherein the high pressure compressor consists of between 7 and 11 stages.

6. The turbine engine according to claim 1, wherein the high pressure compressor (15) defines a cruise pressure ratio of between 12:1 and 18:1.

7. The turbine engine according to claim 1, wherein the high pressure turbine consists of two or fewer stages.

8. The turbine engine according to claim 1, wherein the low pressure turbine comprises four or fewer stages.

9. The turbine engine according to claim 1, wherein the low pressure compressor is positioned axially upstream of the high pressure compressor.

10. The turbine engine according to claim 1, wherein the propulsor is an open rotor or a ducted fan.

11. The turbine engine according to claim 1, wherein each stage of a said compressor or a said turbine comprises a row of rotor blades and a row of stator vanes.

12. The turbine engine according to claim 1,
    wherein the engine comprises a core casing and a nacelle, and
    wherein at least one of the core casing and the nacelle comprises carbon composite material.

13. A method of operating the gas turbine engine of claim 1, the method comprising
    at cruise conditions, (i) operating the low pressure compressor to provide a pressure ratio of between 2.4:1 and 3.3:1, (ii) operating the high pressure compressor to provide a pressure ratio of less than 18:1, and (iii) operating the low and the high pressure compressors to provide a cruise core overall pressure ratio of greater than 36:1.

14. The gas turbine engine according to claim 8, wherein the low pressure turbine comprises three stages.

15. The gas turbine engine according to claim 11, wherein the stator vanes are variable stator vanes.

* * * * *